(12) United States Patent
Yamazaki

(10) Patent No.: US 9,500,012 B2
(45) Date of Patent: Nov. 22, 2016

(54) LOCK DEVICE

(75) Inventor: Takuji Yamazaki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 197 days.

(21) Appl. No.: 14/125,473

(22) PCT Filed: May 15, 2012

(86) PCT No.: PCT/JP2012/062403
§ 371 (c)(1),
(2), (4) Date: Dec. 11, 2013

(87) PCT Pub. No.: WO2012/172905
PCT Pub. Date: Dec. 20, 2012

(65) Prior Publication Data
US 2014/0103666 A1  Apr. 17, 2014

(30) Foreign Application Priority Data

Jun. 16, 2011 (JP) ................ 2011-134010

(51) Int. Cl.
*E05C 3/16* (2006.01)
*E05C 19/12* (2006.01)
(Continued)

(52) U.S. Cl.
CPC ........... *E05C 19/12* (2013.01); *B60N 2/01583* (2013.01); *E05B 85/26* (2013.01); *E05B 77/36* (2013.01); *E05B 85/24* (2013.01); *Y10T 292/0926* (2015.04)

(58) Field of Classification Search
CPC ........ E05C 19/12; E05B 85/26; E05B 77/36; E05B 85/24; B60N 2/01583; Y10T 292/0926

USPC .......... 292/216, 121, 194, DIG. 23; 297/15, 297/331, 335, 336, 378.13, 378.12, 378.14
See application file for complete search history.

(56) References Cited

U.S. PATENT DOCUMENTS 4,067,611 A * 1/1978 Kurozu ................. B60N 2/366
                                                 297/354.12
4,988,135 A * 1/1991 Ottino ..................... E05B 81/20
                                                 292/201

(Continued)

FOREIGN PATENT DOCUMENTS

CN   101133224 A   2/2008
CN   101457609 A   6/2009

(Continued)

OTHER PUBLICATIONS

International Search Report (ISR) (PCT Form PCT/ISA/210), in PCT/JP2012/062403, dated Aug. 7, 2012.

(Continued)

*Primary Examiner* — Vishal Patel
*Assistant Examiner* — Christine M Mills
(74) *Attorney, Agent, or Firm* — McGinn IP Law Group, PLLC

(57) ABSTRACT

An outer peripheral portion of a hook in a lock device is formed with a recess, which is formed to extend inwardly from a peripheral surface, and a first face, which is formed at a side of a rotation direction toward the unlock position of the hook than the recess and intersects the rotation direction of the hook, and a pawl is formed with a protrusion, which is detachably engaged with the recess of the hook, and a second face, against which the first face of the hook is capable of abutting.

9 Claims, 3 Drawing Sheets

(51) Int. Cl.
*B60N 2/015* (2006.01)
*E05B 85/26* (2014.01)
*E05B 77/36* (2014.01)
*E05B 85/24* (2014.01)

(56) References Cited

U.S. PATENT DOCUMENTS

| | | | | |
|---|---|---|---|---|
| 5,154,476 | A * | 10/1992 | Haider | B60N 2/2352 297/367 R |
| 7,066,549 | B2 * | 6/2006 | Dennon | A47C 7/42 297/354.12 |
| 7,210,714 | B2 * | 5/2007 | Berghahn | E05B 81/20 292/201 |
| 7,226,129 | B2 * | 6/2007 | Brandes | B60N 2/366 296/65.01 |
| 7,380,844 | B2 * | 6/2008 | Berghahn | E05B 81/20 292/201 |
| 7,431,371 | B2 * | 10/2008 | Miller | B60N 2/01583 296/65.03 |
| 7,762,605 | B2 * | 7/2010 | Otsuka | B60N 2/01583 248/503.1 |
| 2009/0056393 | A1 | 3/2009 | Otsuka | |
| 2009/0151257 | A1 | 6/2009 | Dominique | |
| 2010/0127511 | A1 | 5/2010 | Vasquez et al. | |

FOREIGN PATENT DOCUMENTS

| | | | | |
|---|---|---|---|---|
| CN | 101806176 A | | 8/2010 | |
| DE | 10339877 A1 | * | 5/2005 | B60P 1/26 |
| DE | 102005035898 | * | 2/2007 | E05B 77/02 |
| DE | 102008010002 | * | 10/2009 | E05B 17/0045 |
| DE | 102009029031 | * | 3/2011 | E05B 85/26 |
| JP | 2004-238841 A | | 8/2004 | |
| JP | 4325794 | | 9/2009 | |
| JP | 2010-195369 A | | 9/2010 | |

OTHER PUBLICATIONS

Chinese Office Action dated Apr. 3, 2015 with an English translation thereof.

* cited by examiner

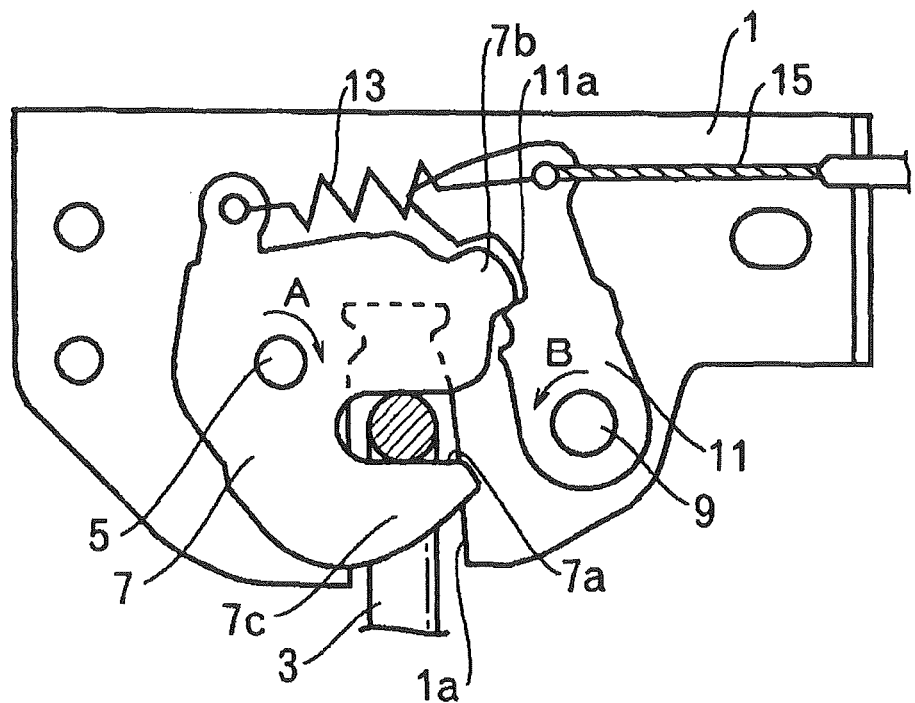
FIG.3  -PRIOR ART-

LOCK DEVICE

TECHNICAL FIELD

The present invention relates to a lock device capable of fixing, for example, a door which can be opened and closed with respect to a vehicle body or a seat which is detachably attached to the vehicle body.

BACKGROUND ART

One example of a lock device is illustrated in FIG. 3. FIG. 3 is a configuration diagram of a background lock device according.

A base 1 provided to any one of a door side (movable side) and a body side (stationary side) is formed with a groove 1a into which a striker provided to the other of the door side (movable side) and the body side (stationary side) is capable of entering.

A hook 7 is rotatably provided to one side of the base by a pin 5, while a pawl 11 is rotatably provided to the other side of the base by a pin 9, with a groove 1a being interposed between the hook 7 and the pawl 11.

The hook 7 is formed with a groove 7a into which the striker 3 enters. Further, an outer peripheral portion of the hook 7 is formed with a protrusion 7b.

The hook 7 in the state illustrated in FIG. 3 is at a lock position at which the striker 3 is restricted from being released from the groove 7a. The state of the hook 7, which is rotated by approximately 45 degrees in a clockwise direction from the state illustrated in FIG. 3, is an unlock position at which the striker 3 enters into the groove 7a.

A lateral portion of the pawl 11 facing the hook 7 is formed with a recess 11a with which the protrusion 7b of the hook 7 is to be engaged.

By a spring 13 having one end locked to the hook 7 and the other end locked to the pawl 11, the hook 7 is biased in an unlock-position direction (direction indicated by the arrow A in the drawing), and the pawl 11 is biased to a direction of the hook 7 (direction indicated by the arrow B in the drawing).

In addition, the pawl 11 is connected to a lock-release cable 15.

Now, the operation of the above-described configuration will be described.

The state of FIG. 3 in which the hook 7 is at the lock position is a state in which the protrusion 7b of the hook 7 is engaged with the recess 11a of the pawl 11 to restrict the hook 7 from rotating in the unlock direction and thus it is in a state in which the striker 3 cannot be released from the groove 7a of the hook 7 (lock state).

If the lock-release cable 15 is pulled against the biasing force of the spring 13, the pawl 11 is released from the hook 7, and then the engagement of the protrusion 7b of the hook 7, so that the recess 11a of the pawl 11 is released. Thus, the hook 7 rotates in the unlock-position direction by the biasing force of the spring 13, and the striker 3 becomes a state which can be released from the groove 7a of the hook 7 (unlock state).

In contrast, in the unlock state, if the inner wall of the groove 7a of the hook 7 is pushed by the striker 3, the hook 7 rotates in the lock-position direction against the biasing force of the spring 13. Then, the protrusion 7b of the hook 7 and the recess 11a of the pawl 11 are engaged with each other, and then the hook 7 is restricted from rotating in the unlock-position direction, so that the striker 3 becomes in the lock state in a state which is not released from the groove 7a of the hook 7 (e.g., see Patent Document 1).

CITATION LIST

Patent Literature

Patent Document 1: Japanese Patent No. 4325794 (FIGS. 2 and 3)

SUMMARY OF INVENTION

Technical Problem

However, in the configuration of the background lock device illustrated in FIG. 3, there is a problem in that if a strong force is applied to the hook 7 to rotate it in the unlock-position direction, the protrusion 7b or a hook portion 7c of the hook 7 would be deformed or the recess 11a of the pawl 11 would be deformed, so that the hook 7 rotates in the unlock-position direction to cause the releasing of the lock state.

The present invention has been made in view of the above-described problem, and an object of the present invention is to provide a lock device having high locking strength.

Solution to Problem

To solve at least one of the above-described problems, a lock device according to one aspect of the present invention includes: a striker, which is provided to one of a movable side and a stationary side; a hook, which is provided to the other of the movable side and the stationary side and formed with a groove into which the striker is capable of entering, wherein the hook is rotatable from an unlock position, at which the striker is capable of entering into the groove, to a lock position, at which the striker is restricted from being released from the groove; a pawl, which is provide to be rotatable and is engaged with the hook located at the lock position to restrict the hook from rotating; and a biasing unit, by which the hook and the pawl are biased in an engaging direction, wherein an outer peripheral portion of the hook is formed with a recess, which is formed to extend inwardly from a peripheral surface, and a first face, which is formed at a side of a rotation direction toward the unlock position of the hook than the recess and intersects the rotation direction of the hook, wherein the pawl is formed with a protrusion, which is detachably engaged with the recess of the hook, and a second face, against which the first face of the hook is capable of abutting.

Other features of the present invention will be further apparent from an embodiment for carrying out the invention described below and the accompanying drawing.

Effect of the Invention

According to the present invention, the outer peripheral portion of the hook is provided with the recess, which is formed to extend inwardly from the peripheral surface, and the first face, which is formed at a side of a rotation direction toward the unlock position of the hook than the recess and intersects the rotation direction of the hook, and the pawl is provided with the protrusion, which is detachably engaged with the recess of the hook, and the second face, against which the first face of the hook capable of abutting. Therefore, the striker enters into the groove of the hook located at the lock position, and the pawl is engaged with the hook, so that a strong force to rotate the hook in the unlock-position direction is exerted in the state in which the hook is restricted from rotating. As a result, even if the hook or the pawl is deformed and thus the hook try to rotate in the unlock-position direction, the first face of the hook abuts against the second face of the pawl to restrict the hook from rotating in the unlock-position direction, so that the locking strength is high.

Other effects of the present invention will be further apparent from the embodiment for carrying out the invention described below and the accompanying drawing.

BRIEF DESCRIPTION OF DRAWINGS

FIG. 3 is a diagram illustrating a background lock device.

DESCRIPTION OF EMBODIMENTS

Next, an embodiment of the present invention will be described with reference to the drawings.

Figure 1:
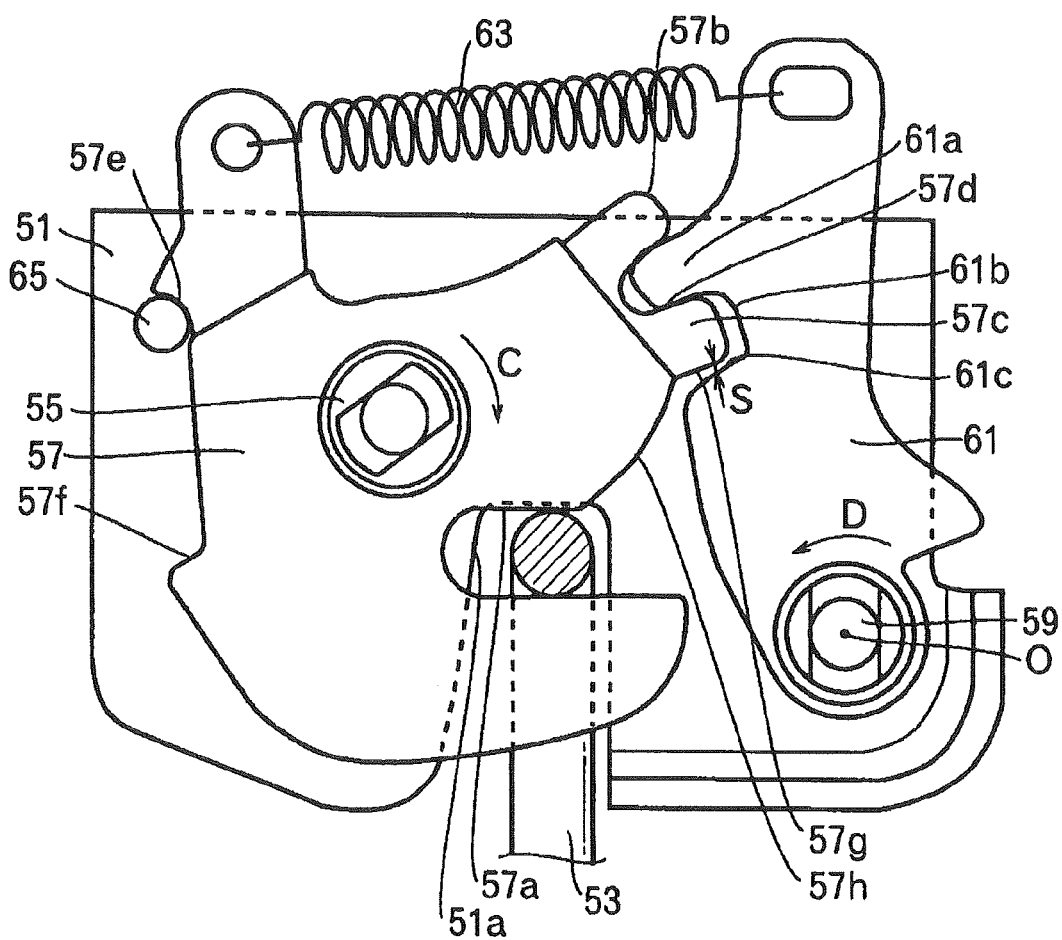
FIG. 1 is a configuration diagram illustrating a lock state of a lock device according to an present embodiment.
Figure 2:
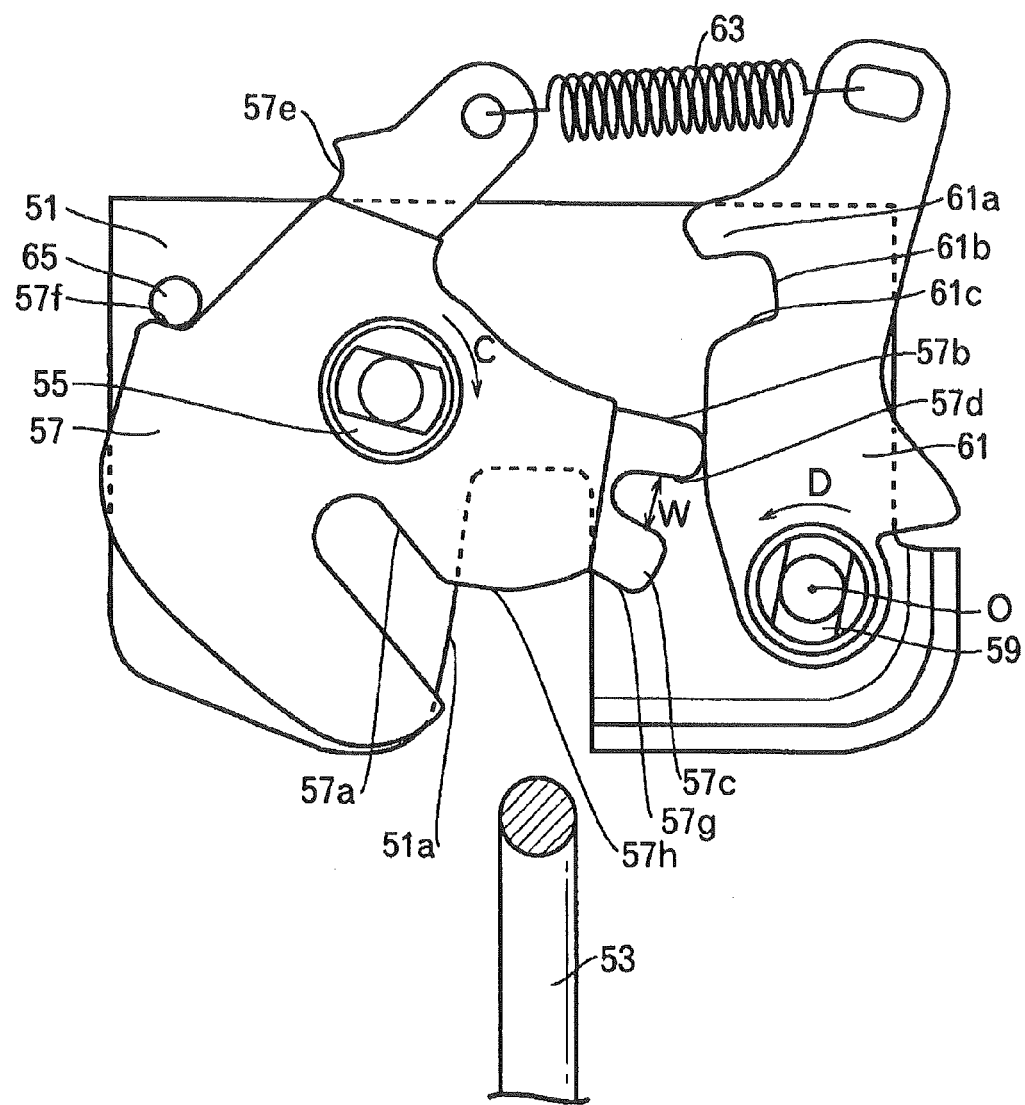
FIG. 2 is a configuration diagram illustrating an unlock state in FIG. 1.

First, a lock device of the embodiment will be described with reference to FIGS. 1 and 2. FIG. 1 is a configuration diagram illustrating a lock state of the lock device according to the embodiment, and FIG. 2 is a configuration diagram illustrating an unlock state in FIG. 1.

In these drawings, a base 51 provided to any one of a door side (movable side) and a body side (stationary side) is formed with a groove 51a into which a striker 53 provided to the other of the door side (movable side) and the body side (stationary side) is capable of entering.

A hook 57 is rotatably provided to one side of the base 51 by a pin 55, while a pawl 61 is rotatably provided to the other side of the base 51 by a pin 59, with a groove 51a located between the hook 57 and the pawl 61.

The hook 57 is formed with a groove 57a into which the striker 53 is capable of entering. Further, the hook 57 is formed with a first protrusion 57b and a second protrusion 57c on an outer peripheral portion along with a direction of the hook 57 rotating to the unlock position. A recess 57d extending inwardly from a peripheral surface is formed between the first protrusion 57b and the second protrusion 57c, that is, between a wall surface of the first protrusion 57b at a side of a rotation direction toward the unlock position of the hook 57 and a wall surface of the second protrusion 57c at a side of a rotation direction toward the lock position. The recess 57d is formed so that a width (indicated by 'w' in FIG. 2) on a rotary plane of the hook 57 is inwardly narrowed. A wall surface of the second protrusion 57c, which is located at a side the rotation direction toward the unlock position of the hook 57 than the recess 57d, at the side of the rotation direction toward the unlock position forms a first face 57g which intersects the rotation direction of the hook 57.

A surface of the pawl 61 facing the hook 57 is formed with a protrusion 61a which is detachably engaged with the recess 57d of the hook 57. Further, the surface of the pawl 61 facing the hook 57 is formed with a recess 61b so that the second protrusion 57c of the hook 57 is detachably engaged with the recess 61b. One of peripheries of the recess 61b formed a second face 61c against which the first face 57g of the hook 57 is capable of abutting.

In this embodiment, as illustrated in FIG. 1, when the hook 57 is positioned at the lock position, the second protrusion 57c of the hook 57 and the recess 61b of the pawl 61 are set so that a gap (s) is formed between the first face 57g of the hook 57 and the second face 61c of the pawl 61.

In addition, the first face 57g of the hook 57 is a planar face, and the second face 61c of the pawl 61 is a circular arc face centered around a rotary center axis (O) of the pawl 61.

Thus, by a spring 63 having one end locked to the hook 57 and the other end locked to the pawl 61, the hook 57 is biased in an unlock-position direction (direction indicated by the arrow C in the drawing), and the pawl 61 is biased to a direction of the hook 7 (direction indicated by the arrow D in the drawing).

Next, the operation of the above-described configuration will be described.

The state of FIG. 1 in which the hook 57 is at the lock position is a state in which the recess 57d of the hook 57 is engaged with the protrusion 61a of the pawl 61, so that the hook 57 is restricted from rotating in the unlock direction and thus the striker 53 is not released from the groove 57a of the hook 57 (lock state).

If the pawl 61 rotates in a counter to an arrow D against the biasing force of the spring 63, the pawl 61 is released from the hook 57, and then the engagement of the recess 57d of the hook 57 and the protrusion 61a of the pawl 61 is released, so that the hook 7 rotates in the unlock-position direction by the biasing force of the spring 63, as illustrated in FIG. 2, and thus the striker 53 becomes a state which can be released from the groove 57a of the hook 57 (unlock state).

In this embodiment, the side of the base 51, to which the hook 57 is provided, is provided with a stopper 65. Meanwhile, the periphery of the hook 57 is formed with a lock stopper surface 57e capable of abutting against the stopper 65 when the hook 57 is located at the lock position (state of FIG. 1). Further, the periphery of the hook 57 is formed with an unlock stopper surface 57f capable of abutting against the stopper 65 when the hook 57 is located at the unlock position (state of FIG. 2). Accordingly, the hook 57 is rotatable from the unlock position to the lock position.

In contrast, in the unlock state, if a surface 57h of the hook 57 adjacent to the opening of the groove 57a is pushed by the striker 53, the hook 57 rotates in the lock-position direction against the biasing force of the spring 63. The recess 57d of the hook 57 is engaged with the protrusion 61a of the pawl 61 to restrict the hook 57 from rotating in the unlock direction, so that the striker 53 becomes in the lock state in the state in which the striker is not released from the groove 57a of the hook 57.

With the above-described configuration, the following effects can be obtained.

(1) Even if a strong force to rotate the hook 57 in the unlock-position direction is applied to the hook 57 in the lock state illustrated in FIG. 1 and even if the second protrusion 57c of the hook 57 is deformed and the hook 57 rotates in the unlock-position direction, the first face 57g of the hook 57 abuts against the second face 61c of the pawl 61 to restrict the hook 57 from rotating in the unlock-position direction, so that the locking strength is high.

(2) Since the recess 57d of the hook 57 is formed so that the width in the rotary plane of the hook 57 is gradually narrowed toward the inside, the protrusion 61a of the pawl 61 certainly abuts against two wall surfaces, which intersect the rotation direction of the hook 57, of the recess 57d of the hook 57. Accordingly, there is no rattle in the engaging portion of the hook 57 and the pawl 61 in the lock state.

(3) When the hook 57 is located at the lock position, the second protrusion 57c of the hook 57 and the recess 61b of the pawl 61 are set so that there is a gap (s) between the first face 57$g$ of the hook 57 and the second face 61$c$ of the pawl 61. The rotation of the hook 57 in the unlock-position direction is normally restricted by only one engagement of the recess 57$d$ of the hook 57 and the protrusion 61$a$ of the pawl 61, so that the engagement of the hook 57 and the pawl 61 becomes smooth.

(4) Since the first face 57$g$ of the hook 57 is the planar face and the second face 61$c$ of the pawl 61 is the circular arc face centered around a rotary center axis O of the pawl 61, the force pressing the second face 61$c$ of the pawl 61 faces the rotary center axis of the pawl 61. Accordingly, the orientation of the force acting on the pawl 61 is constant, so that strength design of the pawl 61 is to be easy.

Further, as the center of the circular arc face is set to the rotary center axis of the pawl 61, a large bending moment is not exerted on the pawl 61, thereby reducing the weight and cost of the lock device.

The present invention is not limited to the above-described embodiment, but can be variously modified within the thought of the present invention and the range defined by the claims.

REFERENCE NUMERALS LIST

53: striker
57: hook
57$a$: groove
57$d$: recess
57$g$: first face
61: pawl
61$a$: protrusion
61$c$: second face
63: spring

The invention claimed is:

1. A lock device, comprising:
    a striker, which is provided to one of a movable structure and a stationary structure;
    a hook, which is provided to another of the movable structure and the stationary structure and formed with a groove into which the striker is capable of entering, wherein the hook is rotatable from an unlock position, at which the striker is capable of entering into the groove, to a lock position, at which the striker is restricted from being released from the groove;
    a pawl, which is provided to be rotatable and is engaged with the hook located at the lock position to restrict the hook from rotating; and
    a biasing unit, by which the hook and the pawl are biased in an engaging direction,
    wherein an outer peripheral portion of the hook is formed with a recess, which is formed to extend inwardly from a peripheral surface, and a first face, which is formed between the recess and the groove and intersects a rotation direction of the hook,
    wherein the pawl is formed with a protrusion, which is detachably engaged with the recess of the hook, and a second face, against which the first face of the hook is capable of abutting,
    wherein the recess of the hook is formed so that a width of the recess in a rotary plane of the hook is inwardly narrowed,
    wherein the recess includes a bottom surface and two wall surfaces, the two wall surfaces facing each other,
    wherein the protrusion of the pawl abuts the two wall surfaces of the recess, at the lock position, and
    wherein, when the hook is located at the lock position, a gap is formed by the first face of the hook and the second face of the pawl, and the gap is located between the first face of the hook and the second face of the pawl.

2. The lock device according to claim 1, wherein the first face of the hook includes a planar face, and the second face of the pawl includes a curved face.

3. The lock device according to claim 2, wherein the curved surface includes a circular arc face.

4. The lock device according to claim 3, wherein a center of the circular arc face is located on a rotary center axis of the pawl.

5. The lock device according to claim 1, wherein the width of the recess decreases between the two wall surfaces as the two wall surfaces extend toward the bottom surface.

6. The lock device according to claim 1, wherein the bottom surface extends between edges of the two wall surfaces.

7. The lock device according to claim 1, wherein the protrusion of the pawl abuts the two wall surfaces of the recess on opposing sides of the bottom surface.

8. The lock device according to claim 1, wherein a stopper is provided in said another of the movable structure and the stationary structure, and
    wherein a periphery of the hook includes a lock stopper surface that is configured to abut against the stopper when the hook is located at the lock position.

9. The lock device according to claim 8, wherein the periphery of the hook further includes an unlock stopper surface that is configured to abut against the stopper when the hook is located at the unlock position.

* * * * *